(12) United States Patent
Lin (10) Patent No.: US 10,379,418 B2
(45) Date of Patent: Aug. 13, 2019

(54) FRESNEL LIQUID CRYSTAL LENS AND DISPLAY DEVICE

(71) Applicant: BOE TECHNOLOGY GROUP CO., LTD., Beijing (CN)

(72) Inventor: Chiachiang Lin, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 8 days.

(21) Appl. No.: 14/912,442

(22) PCT Filed: Jul. 16, 2015

(86) PCT No.: PCT/CN2015/084214
§ 371 (c)(1),
(2) Date: Feb. 17, 2016

(87) PCT Pub. No.: WO2016/138716
PCT Pub. Date: Sep. 9, 2016

(65) Prior Publication Data
US 2017/0010517 A1    Jan. 12, 2017

(30) Foreign Application Priority Data

Mar. 5, 2015   (CN) .......................... 2015 1 0098144

(51) Int. Cl.
*G02F 1/29*         (2006.01)
*G02F 1/1333*     (2006.01)
(Continued)

(52) U.S. Cl.
CPC .............. *G02F 1/29* (2013.01); *G02F 1/1337* (2013.01); *G02F 1/133345* (2013.01);
(Continued)

(58) Field of Classification Search
CPC .. G02F 1/29; G02F 2203/28; G02F 2001/294; G02F 1/133345; G02F 1/1337; G02F 1/134309; G02F 2001/134381
See application file for complete search history.

(56) References Cited

U.S. PATENT DOCUMENTS

2011/0096252 A1*  4/2011  Im .............................. G02B 3/08
                                                                              349/15
2011/0157499 A1*  6/2011  Lee ........................... G02B 3/08
                                                                              349/15
(Continued)

FOREIGN PATENT DOCUMENTS

CN      102053446 A      5/2011
CN      102109729 A      6/2011
(Continued)

OTHER PUBLICATIONS

Notification of the First Office Action dated Dec. 29, 2016 corresponding to Chinese application No. 201510098144.X.
(Continued)

*Primary Examiner* — Jessica M Merlin
(74) *Attorney, Agent, or Firm* — Nath, Goldbereg & Meyer; Joshua B. Goldberg (57) ABSTRACT

The present invention provides a Fresnel liquid crystal lens and a display device. The Fresnel liquid crystal lens comprises an upper substrate and a lower substrate which are aligned and assembled, and a liquid crystal layer provided between the upper substrate and the lower substrate. A layer of first electrodes is provided on a surface of the upper substrate close to the liquid crystal layer and two layers of second electrodes are provided on a surface of the lower substrate close to the liquid crystal layer. An electric field formed between the first electrode and the second electrodes (Continued)

enables the Fresnel liquid crystal lens to simulate the phase delay curve of an ideal Fresnel lens.

12 Claims, 3 Drawing Sheets

(51) Int. Cl.
 *G02F 1/1337* (2006.01)
 *G02F 1/1343* (2006.01)
(52) U.S. Cl.
 CPC .............. *G02F 1/134309* (2013.01); *G02F 2001/134381* (2013.01); *G02F 2001/294* (2013.01); *G02F 2203/28* (2013.01)

(56) References Cited

U.S. PATENT DOCUMENTS

| 2013/0135545 A1* | 5/2013 | Jung | G02F 1/13306 349/33 |
| 2013/0208196 A1* | 8/2013 | Kim | G02F 1/134309 349/15 |
| 2013/0250223 A1* | 9/2013 | Takagi | G02F 1/134336 349/138 |
| 2013/0286342 A1* | 10/2013 | Momonoi | G02F 1/134309 349/139 |
| 2014/0104556 A1* | 4/2014 | Takagi | G02F 1/13306 349/143 |
| 2014/0138022 A1 | 5/2014 | Bae et al. | |

FOREIGN PATENT DOCUMENTS

| CN | 102809868 A | 12/2012 |
| CN | 103901680 A | 7/2014 |
| CN | 104614905 A | 5/2015 |
| JP | 2009-69486 A | 4/2009 |
| JP | 2009069486 A | 4/2009 |

OTHER PUBLICATIONS

International Search Report dated Nov. 23, 2015 issued in corresponding International Application No. PCT/CN2015/084214 along with an English translation of the Written Opinion of the International Searching Authority.

\* cited by examiner

FRESNEL LIQUID CRYSTAL LENS AND DISPLAY DEVICE

This is a National Phase Application filed under 35 U.S.C. 371 as a national stage of PCT/CN2015/084214, filed Jul. 16, 2015, an application claiming the benefit of Chinese Application No. 201510098144.X, filed Mar. 5, 2015, the content of each of which is hereby incorporated by reference in its entirety.

FIELD

An embodiment of the present invention relates to the technical field of display, and in particular to a Fresnel liquid crystal lens and a display device.

BACKGROUND

A Fresnel liquid crystal lens needs to allow significant phase change of liquid crystals within an extremely small space, so that the Fresnel liquid crystal lens can simulate the phase delay characteristics of an ideal Fresnel lens more accurately.

Figure 1:
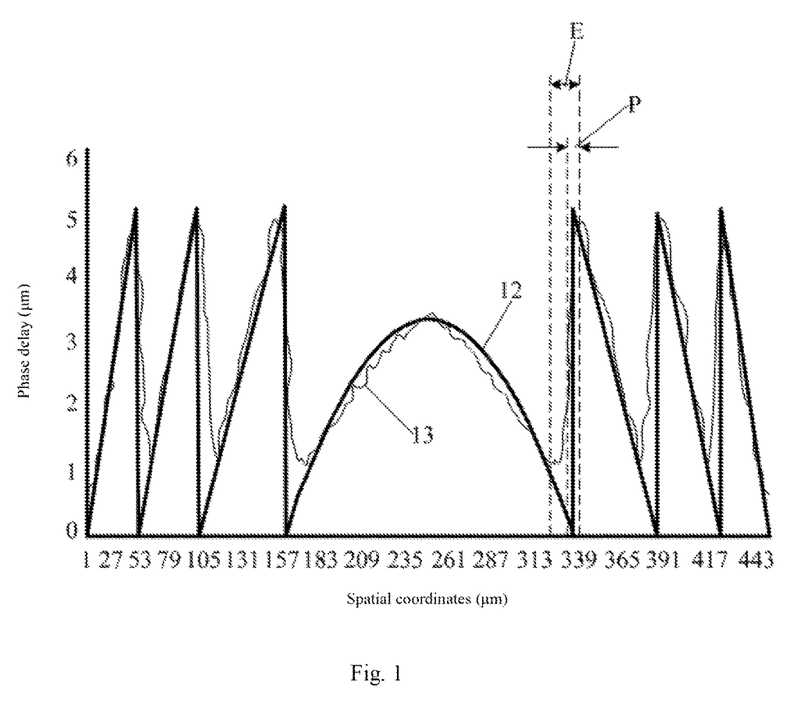
FIG. 1 is a comparison diagram of a liquid crystal phase delay curve simulated by a Fresnel liquid crystal lens in the prior art and a phase delay curve of an ideal Fresnel lens.

As shown in FIG. 1, a phase delay curve 12 of the ideal Fresnel lens is steep at a position P having a maximum change in phase delay, while a phase delay curve 13 stimulated by the Fresnel liquid crystal lens is usually mild at a position E having a maximum change in phase delay.

At present, to make the phase delay curve of the ideal Fresnel lens simulated by the Fresnel liquid crystal lens have higher level of simulation, that is, to make the liquid crystal phase delay curve simulated by the Fresnel liquid crystal lens more close to the phase delay curve of the ideal Fresnel lens, one of the solutions is to provide four layers of electrode structures on a substrate of a liquid crystal cell of a Fresnel liquid crystal lens, and by virtue of an electric field formed by the four layers of electrode structures, the liquid crystal phase delay curve simulated by the Fresnel liquid crystal lens is more close to the phase delay curve of the ideal Fresnel lens.

Due to the four layers of electrode structures, the manufacturing process of the Fresnel liquid crystal lens becomes complex and the allowable error of the four layers of electrode structures during the manufacturing process is small. As a result, it is difficult to manufacture a Fresnel liquid crystal lens of the four layers of electrode structures in some extent.

Another solution is to provide a polymer layer of a specific shape on the liquid crystal layer of the Fresnel liquid crystal lens, so as to reduce the space required by large change in phase difference generated by liquid crystals. However, as the refractive index of the polymer layer is different from that of the liquid crystals, it is likely to cause local refraction. As a result, when the Fresnel liquid crystal lens is in a non-lens working mode, the local refraction is likely to cause unclear light transmittance of the Fresnel liquid crystal lens, and the normal function of the Fresnel liquid crystal lens is influenced.

SUMMARY

An embodiment of the present invention provides, in view of the above technical problems in the prior art, a Fresnel liquid crystal lens and a display device. The Fresnel liquid crystal lens can allow significant phase change of liquid crystals within an extremely small space, so that the Fresnel liquid crystal lens can simulate the phase delay curve of an ideal Fresnel lens more accurately, and further, the Fresnel liquid crystal lens has better phase delay performance.

An embodiment of the present invention provides a Fresnel liquid crystal lens, comprising an upper substrate and a lower substrate which are aligned and assembled, and a liquid crystal layer provided between the upper substrate and the lower substrate, wherein a layer of first electrodes is provided on a surface of the upper substrate close to the liquid crystal layer and two layers of second electrodes are provided on a surface of the lower substrate close to the liquid crystal layer.

Preferably, a first insulating layer is provided between the two layers of second electrodes, the first insulating layer enabling the two layers of second electrodes to be insulated from each other; and the second electrodes include an upper layer of electrodes located on a side of the first insulating layer away from the lower substrate and a lower layer of electrodes located on a side of the first insulating layer close to the lower substrate.

Preferably, the upper layer of electrodes includes a plurality of strip-shaped first sub-electrodes parallel to and spaced apart from each other, the lower layer of electrodes includes a plurality of strip-shaped second sub-electrodes parallel to and spaced apart from each other, and the first sub-electrodes and the second sub-electrodes are parallel to each other; and after an electric signal is applied to the first electrode and the second electrodes, the Fresnel liquid crystal lens can simulate the phase delay curve of an ideal Fresnel lens.

Preferably, one of the first sub-electrodes and one of the second sub-electrodes are arranged at positions, corresponding to a position having a maximum change in phase delay on the phase delay curve of the ideal Fresnel lens, on two sides of the first insulating layer, respectively; and orthographic projections of the first sub-electrode and the second sub-electrode corresponding to the position having a maximum change in phase delay on the phase delay curve of the ideal Fresnel lens on the lower substrate are butt jointed with each other in the widthwise direction thereof, or, the first sub-electrode and the second sub-electrode corresponding to the position having a maximum change in phase delay on the phase delay curve of the ideal Fresnel lens are partially overlapped in the widthwise direction thereof.

Preferably, a voltage applied to the second sub-electrode corresponding to the position having a maximum change in phase delay on the phase delay curve of the ideal Fresnel lens is greater than a voltage applied to the first sub-electrode corresponding to the position having a maximum change in phase delay on the phase delay curve of the ideal Fresnel lens.

Preferably, the thickness of the first insulating layer is 0.1 µm to 1 µm.

Preferably, a width of a orthographic projection of the first sub-electrode and the second sub-electrode corresponding to the position having a maximum change in phase delay on the phase delay curve of the ideal Fresnel lens as a whole, in the widthwise direction of the first sub-electrode and the second sub-electrode, is less than 15 µm.

Preferably, a strip-shaped through hole is formed at a position, corresponding to the position having a maximum change in phase delay on the phase delay curve of the ideal Fresnel lens, on the first electrode, the through hole being parallel to the first sub-electrodes and the second sub-electrodes.

Preferably, the width of the through hole in the widthwise direction of the first sub-electrode and the second sub-electrodes is greater than or equal to 3 µm and less than or equal to 20 µm.

Preferably, the first sub-electrodes adjacent to the first sub-electrode corresponding to the position having a maximum change in phase delay on the phase delay curve of the ideal Fresnel lens is not overlapped with any one of the second sub-electrodes, and orthographic projections of the first sub-electrodes adjacent to the first sub-electrode corresponding to the position having a maximum change in phase delay on the phase delay curve of the ideal Fresnel lens and any one of the second sub-electrodes on the lower substrate are not butt jointed with each other; and the second sub-electrodes adjacent to the second sub-electrode corresponding to the position having a maximum change in phase delay on the phase delay curve of the ideal Fresnel lens is not overlapped with any one of the first sub-electrodes, and orthographic projections of the second sub-electrodes adjacent to the second sub-electrode corresponding to the position having a maximum change in phase delay on the phase delay curve of the ideal Fresnel lens and any one of the first sub-electrodes on the lower substrate are not butt jointed with each other.

Preferably, a second insulating layer is further provided on the upper layer of electrodes, the second insulating layer enabling the plurality of first sub-electrodes to be insulated from each other; and the thickness of the second insulating layer is 1 µm to 3 µm.

Preferably, the thickness of the liquid crystal layer is 10 µm to 30 µm

Preferably, a first alignment layer is further provided on a side of the first electrode on the upper substrate close to the liquid crystal layer, and a second alignment layer is further provided on a side of the second insulating layer on the lower substrate close to the liquid crystal layer, for keeping the liquid crystals in the liquid crystal layer in a specific orientation in the absence of any electric field.

Preferably, a third insulating layer is further provided between the upper substrate and the first electrode.

An embodiment of the present invention further provides a display device, including the Fresnel liquid crystal lens as described above.

An embodiment of the present invention has the following beneficial effects. By providing two layers of second electrodes on the lower substrate, the Fresnel liquid crystal lens of an embodiment of the present invention can allow significant phase change of liquid crystals within an extremely small space, so that the Fresnel liquid crystal lens can simulate the phase delay curve of an ideal Fresnel lens more accurately, and further, the Fresnel liquid crystal lens has better phase delay performance. Compared with the Fresnel liquid crystal lenses in the prior art, the Fresnel liquid crystal lens of an embodiment of the present invention has a simpler structure and is thus more easily manufactured during the practical production. Meanwhile, compared with the Fresnel liquid crystal lenses in the prior art, the Fresnel liquid crystal lens of an embodiment of the present invention can work normally to allow significant phase change of liquid crystals within an extremely small space, since no polymer layer of a specific shape is required. In addition, compared with the Fresnel liquid crystal lenses in the prior art, the Fresnel liquid crystal lens of an embodiment of the present invention can be produced by a greatly simplified manufacturing process and is applicable to mass production.

With regard to the display device of an embodiment of the present invention, the display performance of the display device is improved by using the Fresnel liquid crystal lens as described above.

DETAILED DESCRIPTION OF EMBODIMENTS

To make those skilled in the art understand the technical solutions of an embodiment of the present invention better, a Fresnel liquid crystal lens and a display device provided by an embodiment of the present invention will be further described in detail as below in conjunction with the accompanying drawings and specific implementation manners.

Embodiment 1

Figure 2:
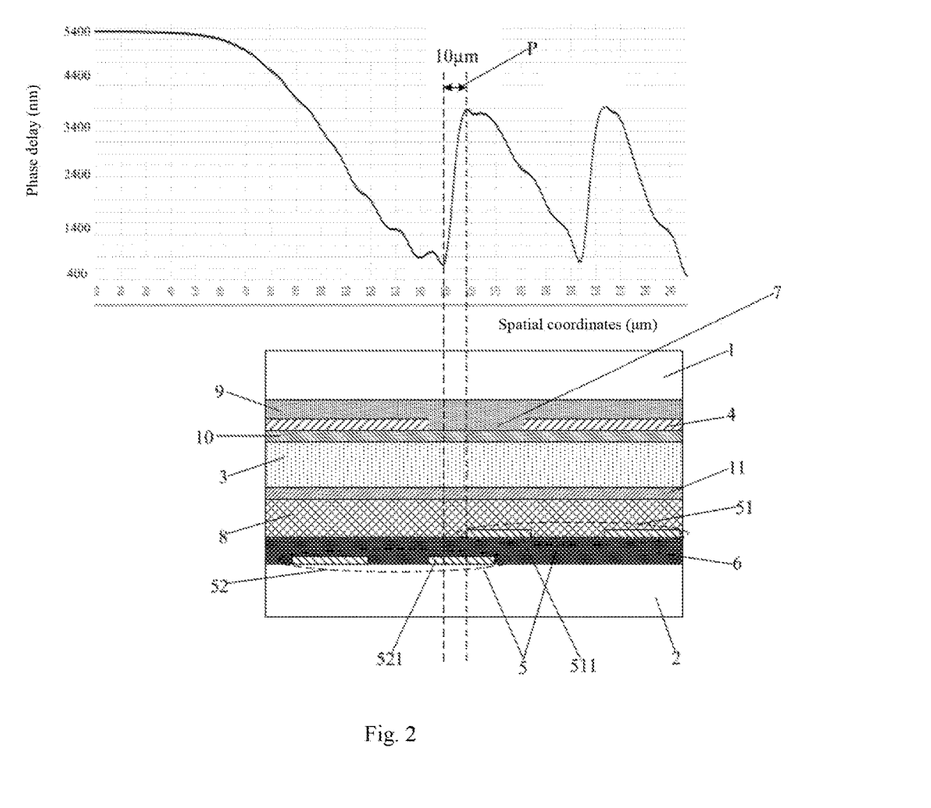
FIG. 2 is a comparison diagram of a partially sectional structure of a Fresnel liquid crystal lens according to Embodiment 1 of the present invention and a part of the phase delay curve of the ideal Fresnel lens.

The present invention provides a Fresnel liquid crystal lens, as shown in FIG. 2, including an upper substrate 1 and a lower substrate 2 which are aligned and assembled, and a liquid crystal layer 3 provided between the upper substrate 1 and the lower substrate 2. A layer of first electrodes 4 is provided on a surface of the upper substrate 1 close to the liquid crystal layer 3 and two layers of second electrodes 5 are provided on a surface of the lower substrate 2 close to the liquid crystal layer 3. An electric field formed between the first electrode 4 and the second electrodes 5 enable the Fresnel liquid crystal lens to simulate the phase delay curve of an ideal Fresnel lens.

By providing two layers of second electrodes 5 on the lower substrate 2, the Fresnel liquid crystal lens of the present invention can allow significant phase change of liquid crystals within an extremely small space, so that the Fresnel liquid crystal lens can simulate the phase delay curve of the ideal Fresnel lens more accurately, and further, the Fresnel liquid crystal lens has better phase delay performance. Compared with the Fresnel liquid crystal lenses in the prior art, the Fresnel liquid crystal lens of the present invention has a simpler structure and is thus more easily manufactured during practical production. Meanwhile, compared with the Fresnel liquid crystal lenses in the prior art, the Fresnel liquid crystal lens of the embodiment can work normally to allow significant phase change of liquid crystals within an extremely small space, since no polymer layer of a specific shape is required.

In this embodiment, a first insulating layer 6 is provided between the two layers of second electrodes 5, the first insulating layer 6 enabling the two layers of second electrodes 5 to be insulated from each other; and the two layers of second electrodes 5 include an upper layer of electrodes 51 located on a side of the first insulating layer 6 away from the lower substrate 2 and a lower layer of electrodes 52 located on a side of the first insulating layer 6 close to the lower substrate 2. The arrangement of the first insulating layer 6 facilitates the formation of an electric field of a certain size between the upper layer of electrodes 51 and the lower layer of electrodes 52, so that the Fresnel liquid crystal lens can simulate the phase delay curve of an ideal Fresnel lens more accurately.

In this embodiment, the upper layer of electrodes 51 includes a plurality of strip-shaped first sub-electrodes 511 parallel to and spaced apart from each other, the lower layer of electrodes 52 includes a plurality of strip-shaped second sub-electrodes 521 parallel to and spaced apart from each other, and the first sub-electrodes 511 and the sub-electrodes 521 are parallel to each other; and after an electric signal is applied to the first electrode 4 and the second electrodes 5, the Fresnel liquid crystal lens can simulate the phase delay curve of an ideal Fresnel lens.

One of the first sub-electrodes 511 and one of the second sub-electrodes 521 are arranged at positions, corresponding to the position P having a maximum change in phase delay on the phase delay curve of the ideal Fresnel lens, on two sides (a side away from the lower substrate 2 and a side close to the lower substrate 2) of the first insulating layer 6, respectively. The first sub-electrode 511 and the second sub-electrode 521 corresponding to the position P having a maximum change in phase delay on the phase delay curve of the ideal Fresnel lens are partially overlapped in the widthwise direction thereof. With such an arrangement, the first sub-electrode 511 in the upper layer corresponding to the position P having a maximum change in phase delay on the phase delay curve of the ideal Fresnel lens can partially shield the electric field of the second sub-electrode 521 in the lower layer, and as a result, at a position corresponding to the position P having a maximum change in phase delay on the phase delay curve of the ideal Fresnel lens, the Fresnel liquid crystal lens can allow significant phase change of liquid crystals within an extremely small space, so that the accuracy of simulation of the phase delay curve of the Fresnel liquid crystal lens is improved.

In this embodiment, a voltage applied to the second sub-electrode 521 corresponding to the position P having a maximum change in phase delay on the phase delay curve of the ideal Fresnel lens is greater than a voltage applied to the first sub-electrode 511 corresponding to the position P having a maximum change in phase delay on the phase delay curve of the ideal Fresnel lens. With such an arrangement, the first sub-electrode 511 with a lower voltage can shield a part of electric field of the second sub-electrode 521 with a higher voltage, and as a result, at a position corresponding to the position P having a maximum change in phase delay on the phase delay curve of the ideal Fresnel lens, the Fresnel liquid crystal lens can allow significant phase change of liquid crystals within an extremely small space. That is, due to the shielding of a part of the electric field of the second sub-electrode 521 by the first sub-electrode 511, the electric field from the second sub-electrode 521 side to the first sub-electrode 511 side is transitioned from a high-voltage electric field to a low-voltage electric field. This reduces the space in which the high-voltage electric field of the second sub-electrode 521 with a higher voltage is distributed (for example, the range of the high-voltage electric field of the second sub-electrode 521 in the X-axis of the cross-section of the space (that is, the horizontal axis in FIG. 2) where the high-voltage electric field is distributed is reduced to be within 10 μm), and hence, it allows significant phase change of liquid crystals in the Fresnel liquid crystal lens, within a small space corresponding to the high-voltage electric field of the second sub-electrode 521, so that the phase delay curve of the Fresnel liquid crystal lens becomes more close to the phase delay curve of the ideal Fresnel lens.

In this embodiment, the thickness of the first insulating layer 6 is 0.1 μm to 1 μm. The first insulating layer 6 of such a thickness can ensure that the first sub-electrode 511 corresponding to the position P having a maximum change in phase delay on the phase delay curve of the ideal Fresnel lens can greatly shield the second sub-electrode 521 corresponding to the position P having a maximum change in phase delay on the phase delay curve of the ideal Fresnel lens, and can also ensure that part of the high-voltage electric field of the second sub-electrode 521 corresponding to the position P having a maximum change in phase delay on the phase delay curve of the ideal Fresnel lens, not shielded by the corresponding first sub-electrode 511, can greatly allow significant phase change of liquid crystals within an extremely space corresponding to the this part, so that the phase delay curve of the Fresnel liquid crystal lens becomes more close to the phase delay curve of the ideal Fresnel lens.

In this embodiment, the width of an orthographic projection of the first sub-electrode 511 and the second sub-electrode 521 corresponding to the position P having a maximum change in phase delay on the phase delay curve of the ideal Fresnel lens as a whole, in the widthwise direction of the first sub-electrodes 511 and the second sub-electrodes 521, is less than 15 μm. This width is an actual total width of a whole formed by partially overlapping the first sub-electrode 511 and the second sub-electrode 521. Since the first sub-electrode 511 shields part of the high-voltage electric field of the second sub-electrode 521 in the width range, the actual range of the high-voltage electric field of the second sub-electrode 521 is reduced (that is, the range of the high-voltage electric field of the second sub-electrode 521 in the X-axis of the cross-section of the space where the high-voltage electric field is distributed is reduced to be within 15 μm), so that the Fresnel liquid crystal lens can allow significant phase change of liquid crystals within an extremely small space (for example, the range of the high-voltage electric field of the second sub-electrode 521 in the X-axis of the cross-section of the space where the high-voltage electric field is distributed is reduced to be within 10 μm), and hence, the phase delay curve of the Fresnel liquid crystal lens becomes more close to the phase delay curve of the ideal Fresnel lens. That is, the Fresnel liquid crystal lens can simulate the phase delay curve of the ideal Fresnel lens more accurately.

In this embodiment, a strip-shaped through hole 7 is formed at a position, corresponding to the position P having a maximum change in phase delay on the phase delay curve of the ideal Fresnel lens, in the first electrode 4, the through hole 7 being parallel to the first sub-electrodes 511 and the second sub-electrodes 521. That is, due to the through hole 7, the first electrode 4 is not provided at the position, corresponding to the position P having a maximum change in phase delay on the phase delay curve of the ideal Fresnel lens, on the upper substrate 1. With such an arrangement, the following even is avoided: no high-voltage electric field is formed at the position of the through hole 7 on the upper substrate 1 by the second sub-electrode 521 corresponding to the through hole 7. Hence, the influence or interference on the high-voltage electric field of the second sub-electrode 521 at the position, corresponding to the position P having a maximum change in phase delay on the phase delay curve of the ideal Fresnel lens, on the upper substrate 1, by the arrangement of the first electrodes 4 at the position, is avoided.

In this embodiment, the width of the through hole 7 in the widthwise direction of the first sub-electrodes 511 and the second sub-electrodes 521 is greater than or equal to 3 μm and less than or equal to 20 μm. With such an arrangement, it can be ensured that the upper substrate 1 will not cause, at the position of the through hole 7, influence or interference on the electric field between the first sub-electrode 511 and the second sub-electrode 521 at corresponding positions on the lower substrate 2. That is, it is ensured that the electric field formed between the first sub-electrode 511 and the second sub-electrode 521 corresponding to the through hole 7 may be transitioned from a high-voltage electric field to a low-voltage electric field within a small range, so that the Fresnel liquid crystal lens can allow significant phase change of liquid crystals within an extremely small space.

In this embodiment, first sub-electrodes 511 adjacent to the first sub-electrode 511 corresponding to the position P having a maximum change in phase delay on the phase delay curve of the ideal Fresnel lens is not overlapped with any one of the second sub-electrodes 521, and orthographic projections of the first sub-electrodes 511 adjacent to the first sub-electrode 511 corresponding to the position P having a maximum change in phase delay on the phase delay curve of the ideal Fresnel lens and any one of the second sub-electrodes 521 on the lower substrate 2 are not butt jointed with each other, either. Second sub-electrodes 521 adjacent to the second sub-electrode 521 corresponding to the position P having a maximum change in phase delay on the phase delay curve of the ideal Fresnel lens is not overlapped with any one of the first sub-electrodes 511, and orthographic projections of the second sub-electrodes 521 adjacent to the second sub-electrode 521 corresponding to the position P having a maximum change in phase delay on the phase delay curve of the ideal Fresnel lens and any one of the first sub-electrodes 511 on the lower substrate 2 are not butt jointed with each other, either. Because both the first sub-electrodes 511 adjacent to the first sub-electrode 511 corresponding to the position P having a maximum change in phase delay on the phase delay curve of the ideal Fresnel lens and the second sub-electrodes 521 adjacent to the second sub-electrode 521 corresponding to the position P having a maximum change in phase delay on the phase delay curve of the ideal Fresnel lens are, respectively, corresponding to regions having a mild phase change on the phase delay curve of the ideal Fresnel lens, it is not required to make the first sub-electrodes 511 and the second electrodes 521 overlapped with each other at those positions. That is, a relatively mild phase change may be realized as long as a relatively mild electric field is formed between the first sub-electrodes 511 or second electrodes 521 and the first electrodes 4 on the upper substrate 1.

It is to be noted that, a voltage applied to other first sub-electrodes 511 adjacent to the first sub-electrode 511 corresponding to the position P having a maximum change in phase delay on the phase delay curve of the ideal Fresnel lens is less than a voltage applied to the second sub-electrode 521 corresponding to the position P having a maximum change in phase delay on the phase delay curve of the ideal Fresnel lens, and a voltage applied to other second sub-electrodes 521 adjacent to the second sub-electrode 521 corresponding to the position P having a maximum change in phase delay on the phase delay curve of the ideal Fresnel lens is less than a voltage applied to the second sub-electrode 521 corresponding to the position P having a maximum change in phase delay on the phase delay curve of the ideal Fresnel lens. Furthermore, a voltage applied to other first sub-electrodes 511 adjacent to the first sub-electrode 511 corresponding to the position P having a maximum change in phase delay on the phase delay curve of the ideal Fresnel lens is greater than a voltage applied to the first sub-electrode 511 corresponding to the position P having a maximum change in phase delay on the phase delay curve of the ideal Fresnel lens, and a voltage applied to other second sub-electrodes 521 adjacent to the second sub-electrode 521 corresponding to the position P having a maximum change in phase delay on the phase delay curve of the ideal Fresnel lens is greater than a voltage applied to the first sub-electrode 511 corresponding to the position P having a maximum change in phase delay on the phase delay curve of the ideal Fresnel lens.

In this embodiment, a second insulating layer 8 is further provided on the upper layer of electrodes 51, and the second insulating layer 8 enables the plurality of first sub-electrodes 511 to be insulated from each other; and the thickness of the second insulating layer 8 is 1 μm to 3 μm. The second insulating layer 8 of such a thickness can reduce the influence on the deflection (i.e., phase change) of liquid crystals in the Fresnel liquid crystal lens by the electric field formed between the adjacent first sub-electrodes 511, so that the liquid crystals have phase change under the effect of the electric field generated between the first electrode 4 on the upper substrate 1 and the second electrodes 5 on the lower substrate 2 as far as possible.

In this embodiment, the thickness of the liquid crystal layer 3 is 10 μm to 30 μm. Due to the above design of the electrode structure of the Fresnel liquid crystal lens, the Fresnel liquid crystal lens can be produced by a greatly simplified manufacturing process and is applicable to mass production.

In this embodiment, a first alignment layer 10 is further provided on a side of the first electrode 4 on the upper substrate 1 close to the liquid crystal layer 3, and a second alignment layer 11 is further provided on a side of the second insulating layer 8 on the lower substrate 2 close to the liquid crystal layer 3. The arrangement of the first alignment layer 10 and the second alignment layer 11 can keep the liquid crystals in the liquid crystal layer 3 in a specific orientation in the absence of any electric field, so that the Fresnel liquid crystal lens can better make the phase of light rays passing therethrough change by means of the deflection of liquid crystals. In addition, a third insulating layer 9 is further provided between the upper substrate 1 and the first electrode 4.

Embodiment 2

Figure 3:
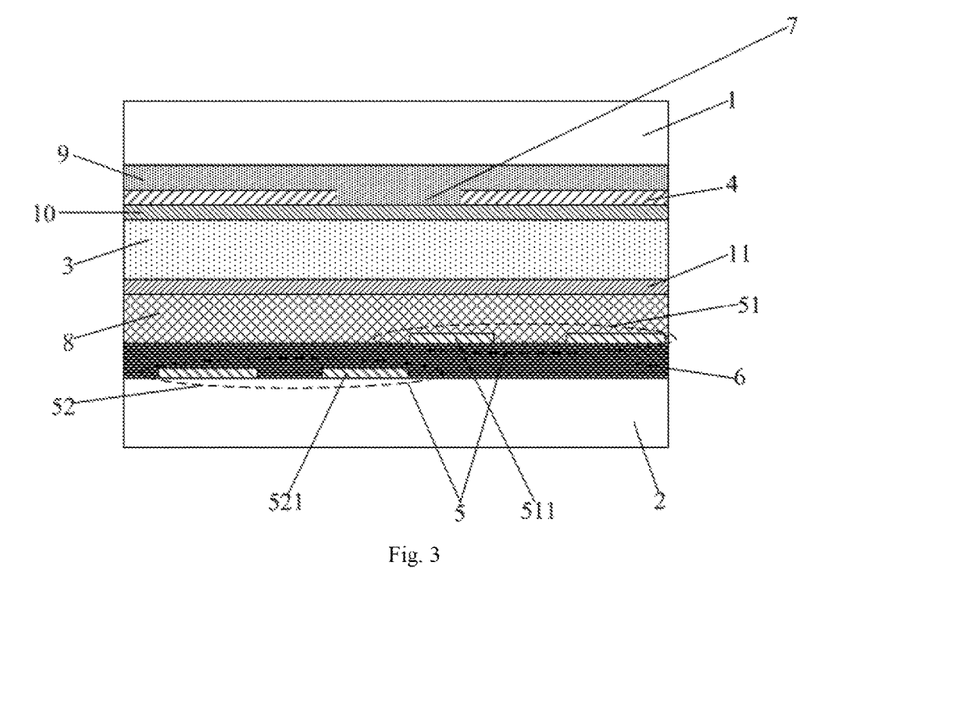
FIG. 3 is a partially sectional structure diagram of a Fresnel liquid crystal lens according to Embodiment 2 of the present invention.

This embodiment provides a Fresnel liquid crystal lens. Different from Embodiment 1, as shown in FIG. 3, orthographic projections of the first sub-electrode 511 and the second sub-electrode 512 corresponding to the position having a maximum change in phase delay on the phase delay curve of the ideal Fresnel lens on the lower substrate 2 are butt jointed with each other in the widthwise direction thereof.

With such an arrangement, the first sub-electrode 511 in the upper layer corresponding to the position P having a maximum change in phase delay on the phase delay curve of the ideal Fresnel lens can also partially shield the electric field of the second sub-electrode 521 in the lower layer corresponding to the position P having a maximum change in phase delay on the phase delay curve of the ideal Fresnel lens, and as a result, at a position corresponding to the position P having a maximum change in phase delay on the phase delay curve of the ideal Fresnel lens, the Fresnel liquid crystal lens can allow significant phase change of liquid crystals within an extremely small space, so that the accuracy of simulation of the phase delay curve of the Fresnel liquid crystal lens is improved.

Other structures of the Fresnel liquid crystal lens in this embodiment are the same as those in Embodiment 1, and will not be repeatedly described herein.

Both Embodiment 1 and Embodiment 2 have the following beneficial effects. By providing the two layers of second electrodes on the lower substrate, the Fresnel liquid crystal lenses in Embodiment 1 and Embodiment 2 can allow significant phase change of liquid crystals within an extremely small space, so that the Fresnel liquid crystal lenses can simulate the phase delay curve of an ideal Fresnel lens more accurately, and further, the Fresnel liquid crystal lenses have better phase delay performance. Compared with the Fresnel liquid crystal lenses in the prior art, the Fresnel liquid crystal lenses have a simpler structure and are thus more easily manufactured during the practical production. Meanwhile, compared with the Fresnel liquid crystal lenses in the prior art, the Fresnel liquid crystal lenses in Embodiment 1 and Embodiment 2 can work normally to allow significant phase change of liquid crystals within an extremely small space, since no polymer layer of a specific shape is required. In addition, compared with the Fresnel liquid crystal lenses in the prior art, the Fresnel liquid crystal lenses in Embodiment 1 and Embodiment 2 can be produced by a greatly simplified manufacturing process and are applicable to mass production.

Embodiment 3

This embodiment provides a display device including any one of the Fresnel liquid crystal lenses in Embodiment 1 and Embodiment 2.

When the Fresnel liquid crystal lens is applied to a liquid crystal display device, the Fresnel liquid crystal lens can be provided between a backlight source and a liquid crystal display panel. The Fresnel liquid crystal lens can change the backlight direction of the liquid crystal display device, to improve the backlight brightness of the liquid crystal display device, and further to improve the quality of display of the liquid crystal display device.

For example, the Fresnel liquid crystal lens may also be applied to a 3D naked-eye display device. With a 3D display device using this Fresnel liquid crystal lens, a viewer may watch 3D images without wearing 3D glassless, so that it is more convenient for watching a 3D display device.

By using any one of the Fresnel liquid crystal lenses in Embodiment 1 and Embodiment 2, the display performance of the display device may be improved.

It may be understood that, the above implementation manners are exemplary implementation manners merely used for describing the principle of an embodiment of the present invention, and an embodiment of the present invention is not limited thereto. For a person of ordinary skill in the art, various variations and improvements may be made without departing from the spirit and essence of an embodiment of the present invention, and those variations and improvements shall be regarded as being within the protection scope of an embodiment of the present invention.

The invention claimed is:
1. A Fresnel liquid crystal lens, comprising an upper substrate and a lower substrate which are aligned and assembled, and a liquid crystal layer provided between the upper substrate and the lower substrate,
wherein:
only one layer of first electrodes is provided on a surface of the upper substrate close to the liquid crystal layer and two layers of second electrodes are provided on a surface of the lower substrate close to the liquid crystal layer;
a first insulating layer is provided between the two layers of second electrodes, the first insulating layer enabling the two layers of second electrodes to be insulated from each other;
the two layers of second electrodes comprise an upper layer of electrodes located on a side of the first insulating layer away from the lower substrate and a lower layer of electrodes located on a side of the first insulating layer close to the lower substrate;
the upper layer of electrodes comprises a plurality of strip-shaped first sub-electrodes parallel to and spaced apart from each other, the lower layer of electrodes comprises a plurality of strip-shaped second sub-electrodes parallel the two spaced apart from each other, and the first sub-electrodes and the second sub-electrodes are parallel to each other;
orthographic projections of one first sub-electrode and one second sub-electrode at a position on the lower substrate are butt jointed with each other or are partially overlapped in the widthwise direction thereof;
a strip-shaped through hole is formed at a position, corresponding to the position where the orthographic projections of the one first sub-electrode and the one second sub-electrode at the position on the lower substrate are butt jointed with each other or are partially overlapped in the widthwise direction thereof, on the layer of first electrodes such that there is no electrode provided at the position between the upper substrate and the liquid crystal layer, the through hole being parallel to the first sub-electrodes and the second sub-electrodes for preventing a high-voltage electric field being formed at the position of the through hole on the upper substrate by the second sub-electrode,
wherein the first sub-electrodes adjacent to the one first sub-electrode, at the position on the lower substrate where the orthographic projections of the one first sub-electrode and the one second sub-electrode are butt jointed with each other or are partially overlapped in the widthwise direction thereof, are not overlapped with any of the second sub-electrodes, and orthographic projections of the first sub-electrodes adjacent to the one first sub-electrode and any of the second sub-electrodes on the lower substrate are not butt jointed with each other; and
the second sub-electrodes adjacent to the one second sub-electrode, at the position on the lower substrate where the orthographic projections of the one first sub-electrode and the one second sub-electrode are butt jointed with each other or are partially overlapped in the widthwise direction thereof, are not overlapped with any one of the first sub-electrodes, and orthographic projections of the second sub-electrodes adjacent to the one second sub-electrode and any one of the first sub-electrodes on the lower substrate are not butt jointed with each other.

2. The Fresnel liquid crystal lens according to claim 1, wherein a voltage applied to the one second sub-electrode is greater than a voltage applied to the one first sub-electrode.

3. The Fresnel liquid crystal lens according to claim 2, wherein the thickness of the first insulating layer is 0.1 µm to 1 µm.

4. The Fresnel liquid crystal lens according to claim 1, wherein the thickness of the first insulating layer is 0.1 µm to 1 µm.

5. The Fresnel liquid crystal lens according to claim 1, wherein a width of an orthographic projection of the one first sub-electrode and the one second sub-electrode as a whole, in the widthwise direction of the first sub-electrode and the second sub-electrode, is less than 15 µm.

6. The Fresnel liquid crystal lens according to claim 1, wherein a width of the through hole in the widthwise direction of the first sub-electrode and the second sub-electrode is greater than or equal to 3 µm and less than or equal to 20 µm.

7. The Fresnel liquid crystal lens according to claim 1, wherein a second insulating layer is further provided on the upper layer of electrodes, the second insulating layer enabling the plurality of first sub-electrodes to be insulated from each other; and the thickness of the second insulating layer is 1 µm to 3 µm.

8. The Fresnel liquid crystal lens according to claim 7, wherein a first alignment layer is further provided on a side of the layer of first electrodes on the upper substrate close to the liquid crystal layer, and a second alignment layer is further provided on a side of the second insulating layer on the lower substrate close to the liquid crystal layer, to enable liquid crystals in the liquid crystal layer to be maintained in a specific orientation in the absence of any electric field.

9. The Fresnel liquid crystal lens according to claim 1, wherein the thickness of the liquid crystal layer is 10 µm to 30 µm.

10. The Fresnel liquid crystal lens according to claim 1, wherein a third insulating layer is further provided between the upper substrate and the first electrode.

11. A display device, comprising a Fresnel liquid crystal lens according to claim 1.

12. The Fresnel liquid crystal lens according to claim 1, wherein a voltage applied to other first sub-electrodes adjacent to the one first sub-electrode is less than a voltage applied to the one second sub-electrode, and a voltage applied to other second sub-electrodes adjacent to the one second sub-electrode is less than a voltage applied to the one second sub-electrode, and a voltage applied to other first sub-electrodes adjacent to the one first sub-electrode is greater than a voltage applied to the one first sub-electrode, and a voltage applied to other second sub-electrodes adjacent to the one second sub-electrode is greater than a voltage applied to the one first sub-electrode.

* * * * *